United States Patent
Iyoki et al.

(10) Patent No.: US 7,170,054 B2
(45) Date of Patent: Jan. 30, 2007

(54) SCANNING PROBE MICROSCOPY CANTILEVER HOLDER AND SCANNING PROBE MICROSCOPE USING THE CANTILEVER HOLDER

(75) Inventors: Masato Iyoki, Chiba (JP); Masatsugu Shigeno, Chiba (JP)

(73) Assignee: SII Nanotechnology Inc. (JP)

( * ) Notice: Subject to any disclaimer, the term of this patent is extended or adjusted under 35 U.S.C. 154(b) by 0 days.

(21) Appl. No.: 11/199,290

(22) Filed: Aug. 8, 2005

(65) Prior Publication Data

US 2006/0043290 A1     Mar. 2, 2006

(30) Foreign Application Priority Data

Aug. 24, 2004   (JP)   ............................. 2004-243124
May 23, 2005   (JP)   ............................. 2005-148929

(51) Int. Cl.
  *G01N 13/16*   (2006.01)
  *G01B 5/28*    (2006.01)

(52) U.S. Cl. ..................... 250/306; 250/309; 73/105

(58) Field of Classification Search ..................... None
See application file for complete search history.

(56) References Cited

U.S. PATENT DOCUMENTS 5,717,132 A * 2/1998 Watanabe et al. ............. 73/105

* cited by examiner

*Primary Examiner*—Nikita Wells
(74) *Attorney, Agent, or Firm*—Adams & Wilks

(57) ABSTRACT

A scanning probe microscope having a cantilever holder is provided which gives a cantilever great amplitude by a small-sized vibrator configurable in a limited space and is stably operated even in environments of high viscous drag such as a liquid. A cantilever base part of a cantilever is fixed to a fixing part of a scanning probe microscopy cantilever holder. A vibrator is mounted on the fixing part. When it is defined that the front side is the side close to a probe and the rear side is the side close to a supporting part of the fixing part along in the longitudinal direction of the cantilever, the vibrator displaces the front and rear sides of the fixing part of the cantilever holder to each other in the opposite directions within the plane orthogonal to the sample surface to vibrate the cantilever in a liquid.

14 Claims, 5 Drawing Sheets

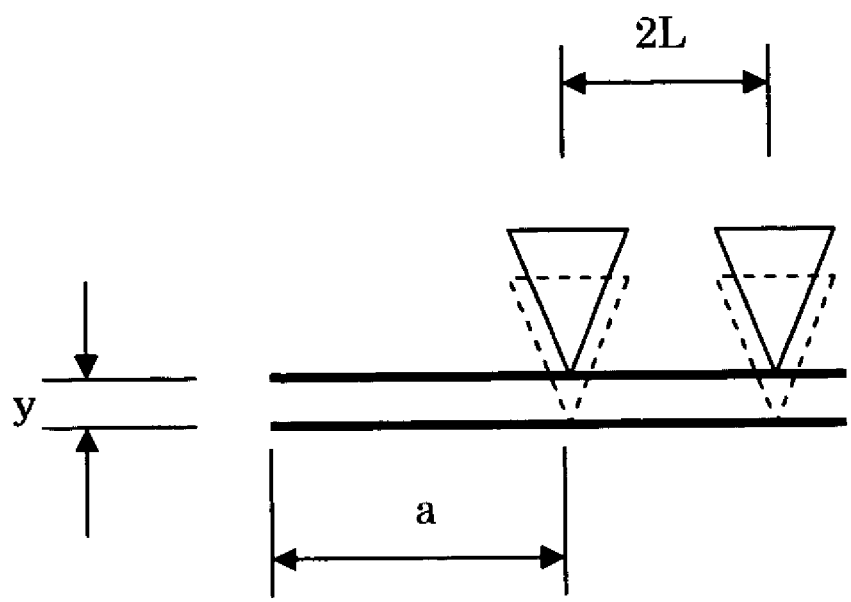
Fig.3-a
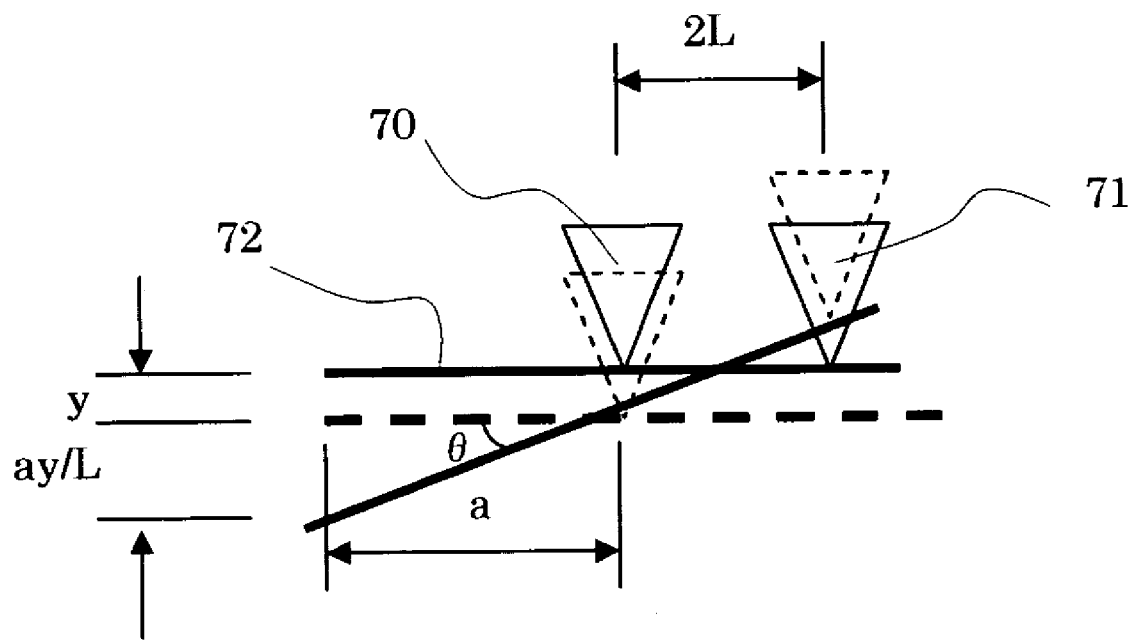
Fig.3-b

SCANNING PROBE MICROSCOPY CANTILEVER HOLDER AND SCANNING PROBE MICROSCOPE USING THE CANTILEVER HOLDER

BACKGROUND OF THE INVENTION

1. Field of the Invention

The present invention relates to a scanning probe microscopy cantilever holder which vibrates a cantilever having a probe at the top of the cantilever in the direction orthogonal to the surface of a sample and relatively scans the sample and the probe by a fine adjustment mechanism while detecting the interaction between the probe and the surface to control the distance for measuring the topography and physical properties of the sample surface, machining the sample surface, or moving substances on the sample surface by the probe, and to a scanning probe microscope using the cantilever holder.

2. Description of the Related Art

In a traditional scanning probe microscope, the base part at the end of a cantilever having a probe at the tip end thereof is fixed to a cantilever holder, and forcedly vibrated at the frequency near the resonance frequency of the cantilever by a vibrating module such as a piezoelectric device. The amplitude or phase at that time are measured by a displacement detecting module such as an optical lever mode. The sample is placed on a triaxial fine adjustment mechanism such as a cylindrical piezoelectric device.

The sample is brought close to the probe by a coarse adjustment mechanism, and then the probe and the sample are brought closer enough to each other by the triaxial fine adjustment mechanism. Physical force such as atomic force is then acted between the sample and the probe, the sample and the probe are brought closer to each other to intermittently contact with each other in response to the vibration of the cantilever, and contact force is acted on them. The atomic force or contact force vary the amplitude or phase of the cantilever.

The physical force such as atomic force and the intermittent contact force depend on the distance between the probe and the sample. The probe and the sample are brought close to the area where atomic force or contact force are acted, and they are scanned in the two-dimensional plane by the triaxial fine adjustment mechanism while controlling the distance between the sample and the probe so that the amplitude or phase of the cantilever are always kept constant. Thus, the topographic image on the sample surface is imaged. Furthermore, the detection of the physical action on the apex of the probe and the sample surface also allows the measurement of physical properties such as electrical properties or optical properties. The measurement by the scanning probe microscope is conducted in the atmosphere in many cases. For example, in the case of bio-samples such as cells, chromosomes, DNA, and proteins, a sample is altered when it is exposed in the atmosphere. Thus, in some cases, measurement is conducted while the cantilever is being vibrated in a solution such as a culture solution.

Here, the configuration of a scanning probe microscope of the related art will be described with reference to FIG. 9 (for example, see Patent Reference 1).

In this related art, alternating voltage signals are applied to a vibrator 102 to forcedly vibrate a cantilever 101 vertically to a sample 103, and the cantilever 101 is driven at the frequency near the resonance frequency. At this time, the amount of amplitude of the vibration of the cantilever is detected by a deffection detector 104. For the distortion detector 104, a displacement gage by the optical lever mode using a semiconductor laser is generally used. When a probe 101a at the top of the cantilever 101 is apart far enough from the surface, the cantilever 101 is vibrated at constant amplitude, and the deffection detector 104 detects the alternating voltage signal matched with the vibration of the cantilever 101. The alternating current signal detected by the deffection detector 104 is measured as a root-mean-square value of the alternating current signal of the deffection detector by an RMS (Root Mean Square) detector 105.

When the apex of the probe 101a is brought close to the surface of the sample 103, atomic force is generally acted between the probe 101a and the sample 103. The sample and the probe are brought closer to each other, and then intermittently contacted with each other in response to the vibration of the cantilever, and contact force is acted on them. The atomic force or intermittent contact force attenuate the amplitude. A certain amplitude value after attenuation is set as a target value to allow controlling the distance between the probe 101a and the sample 103. A Z-translation controller 106 and a feedback control system 107 drive the XYZ-translation unit 108, and the XYZ-translation unit 108 scans the plane of the sample 103 (in the XY-direction) by an XY-scan control part 109 while controlling the distance between the probe 101a and the sample 103 (in the Z-direction). Thus, a three-dimensional image of the surface of the sample 103 can be generated.

Moreover, for the scanning probe microscope driven in a solution is utilized for observing biosamples and organic thin film samples in a liquid (for example, see Patent Reference 2).

Patent Reference 1 Japanese Patent No. 3,266,267 (page 13, FIG. 3)

Patent Reference 2 Japanese Patent No. 2,936,311 (page 13, FIG. 1)

SUMMARY OF THE INVENTION

However, gas such as air exists in the atmosphere and a solution exists in a liquid around the cantilever being forcedly vibrated. They hamper the vibration of the cantilever as viscous drag to cause a change in the vibration amplitude or phase of the cantilever. Essentially, for a change in the vibrating state for measuring samples, a change in vibration is required that is caused by atomic force or intermittent contact force that are acted when the probe and the sample are brought close to each other. A change in the vibrating state caused by viscous drag is unnecessary, leading to a factor that reduces performance such as measurement accuracy. Particularly, viscous drag is great in the solution, and the vibration is significantly attenuated to increase the ratio of noise components in the vibration of the cantilever, causing a problem that stable amplitude required for sample measurement cannot be obtained.

In order to solve the problem, it is necessary to increase the amplitude of the vibrator which forcedly vibrates the cantilever in order to obtain stable amplitude against viscous drag as well.

In order to increase the amplitude of the cantilever in the vibrator which forcedly amplitudes the cantilever such as a piezoelectric device generally used, it is necessary to increase the dimensions of the vibrator itself. However, a displacement measuring module is disposed around the vibrator, which measures the amplitude or phase of the cantilever by the optical lever mode, and space is limited to impose limitation on the vibrator for size increase.

An increased vibrator in size grows weight to cause the reduction in the stiffness of the instrument, vibration proof against the external vibration is decreased, and measurement accuracy is dropped. An increased weight drops the resonance frequency of the instrument to reduce the response when the cantilever and the sample are relatively moved. Consequently, a problem of prolonged measuring time arises.

Accordingly, an object of the invention is to provide a cantilever holder which can stably vibrate a cantilever by a small-sized vibrator configurable in a limited space even when viscous drag exists.

The invention provides the following units for solving the problems.

A scanning probe microscopy cantilever holder includes:
a cantilever having a probe at the top of the cantilever;
a cantilever fixing part which fixes a base part of the cantilever;
a vibrator which is fixed to the cantilever fixing part and vibrates the cantilever through the cantilever fixing part; and
a base block which holds the cantilever fixing part and the vibrator,
wherein the apex of the probe is disposed as facing a sample surface,
a central axis of rotation is disposed which is nearly orthogonal to a major axis of the cantilever on the base part of the cantilever and is parallel in a direction of the sample surface, and
the vibrator vibrates the base part of the cantilever to rock the base part of the cantilever as centering the central axis of rotation.

Furthermore, in the scanning probe microscopy cantilever holder, in the vibrator, when it is defined that a front side of the vibrator is a side close to the probe and a far side is a rear side along in a longitudinal direction of the cantilever, and
the front side and the rear side of the vibrator are vibrated while they are being displaced to each other in opposite directions within a plane orthogonal to the sample surface.

Moreover, in the scanning probe microscopy cantilever holder, the base part of the cantilever having a probe at the top of the cantilever has a piezoelectric vibrator which vibrates the cantilever in the vertical direction against a sample, and the piezoelectric vibrator is applied with polling reversely on the front and rear sides of the cantilever in the longitudinal direction.

Furthermore, according to the invention, in the scanning probe microscopy cantilever holder, the base block is disposed with a supporting part which supports the central axis of rotation,
the vibrator vibrates a part of the base part of the cantilever within the plane orthogonal to the sample surface, and
the base part of the cantilever is rocked as centering the supporting part.

Moreover, according to the invention, a scanning probe microscope includes:
a sample holder which places a sample thereon;
a cantilever which is brought close to or contacted with the sample;
a cantilever holder which places the cantilever thereon; and
a triaxial fine adjustment mechanism which relatively moves the sample and the cantilever,
wherein the cantilever holder is the scanning probe microscopy cantilever holder described above.

According to the scanning probe microscopy cantilever holder and the scanning probe microscope using the cantilever holder of the invention, the structure is formed in which the front and rear sides of the cantilever fixing part are displaced to each other in the opposite directions within the plane orthogonal to the sample surface.

At this time, the front and rear sides of the base part of the cantilever fixed to the cantilever fixing part are forcedly vibrated alternately in the opposite directions for rocking.

Furthermore, the structure is formed in which the supporting part which supports the central axis of rotation is disposed on the base part of the base block of the cantilever holder, and the vibrator vibrates a part of the base part of the cantilever within the plane orthogonal to the sample surface.

At this time, the base part of the cantilever is rocked as centering the supporting part.

In these structures, when the vibrator in the same size is used, it can vibrate with a greater displacement than in the case where the entire fixing part is vertically moved in translation movement. Therefore, the amplitude of the cantilever can be increased.

Consequently, noise in the cantilever vibration are relatively decreased even under the influence of a solution and atmospheric viscous drag, stable amplitude is obtained that is necessary for measurement, and highly accurate measurement is allowed.

Besides, when the amplitude is the same, the vibrator is decreased in size to be configured in the limited space. The light-weight apparatus improves the stiffness of the apparatus, and thus measurement accuracy can be enhanced.

BRIEF DESCRIPTION OF THE DRAWINGS

The teachings of the invention can be readily understood by considering the following detailed description in conjunction with accompanying drawings, in which:

FIGS. 3A and 3B are schematic diagrams illustrating the vibrating state of a cantilever shown in FIGS. 1 and 2.

DESCRIPTION OF THE PREFERRED EMBODIMENT

Figure 1:
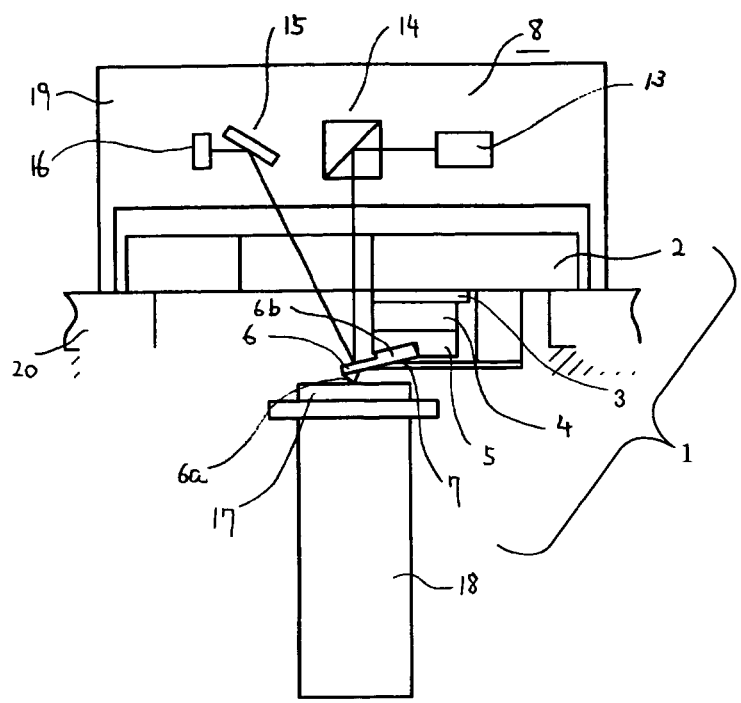
FIG. 1 is a profile illustrating a scanning probe microscope of a first embodiment according to the invention.

Hereinafter, the best mode for implementing the invention will be described in detail with reference to the drawing.

Embodiments

A first embodiment of a cantilever holder for use in a scanning probe microscope under an atmospheric environment and a scanning probe microscope using the cantilever holder according to the invention is shown in FIG. 1 as a block diagram. To a base block 2 of a cantilever holder 1, a vibrator 4 configured of a piezoelectric device is adhered and fixed through an insulating plate 3. To the vibrator 4, a cantilever fixing part 5 which fixes a cantilever 6 is adhered and fixed. A tilt on which the cantilever 6 is obliquely mounted is formed in the cantilever fixing part 5 in order to reflect the laser beam of an optical lever system 8 for displacement detection.

On the cantilever fixing part 5, the cantilever 6 is placed which has a microprobe 6a at the top of the cantilever and a base part 6b at the end of the cantilever and is formed of materials such as silicon and silicon nitride. The cantilever 6 is fixed by pressing the base part 6b against the fixing part 5 with a leaf spring 7.

Figure 2:
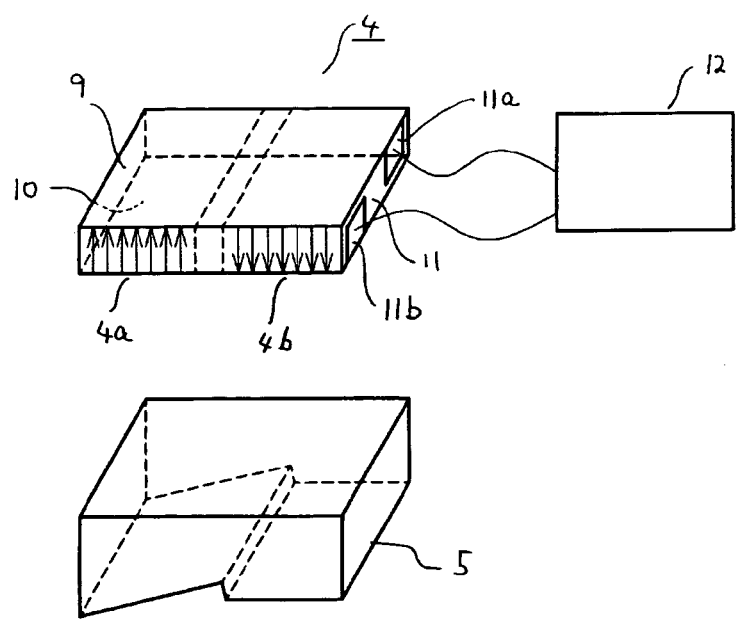
FIG. 2 is a detail drawing illustrating a vibrator of a cantilever holder shown in FIG. 1.

Here, the vibrator 4 and the cantilever fixing part 5 shown in FIG. 1 will be described with reference to FIG. 2. The vibrator 4 is configured of a piezoelectric device in a flat plate. When the cantilever is mounted, suppose it is defined that a front side 4a of the vibrator is the side close to the probe 6a and a rear side 4b of the vibrator is the side close to the base part 6b at the end along in the longitudinal direction of the cantilever. The vibrator 4 is applied with polling in the thickness direction so that the front side 4a and the rear side 4b are in the opposite directions to each other from the center of the vibrator 4. The polling state is shown by arrows in FIG. 2.

Furthermore, on the surface contacting with the insulating plate 3 of the vibrator 4 and the surface contacting with the cantilever fixing part 5, electrodes 9 and 10 are disposed on the entire surfaces, respectively. Moreover, on a rear side surface 11, terminal electrodes 11a and 11b are disposed. The terminal electrode 11a is connected to the electrode 9, and the terminal electrode 11b is connected to the electrode 10.

The terminal electrodes 11a and 11b are connected to an alternating current generator 12, and alternating voltage is applied between the electrode 9 and the electrode 10 of the vibrator.

At this time, when the alternating voltage is applied, the front side 4a and the rear side 4b of the vibrator are displaced in the opposite directions because they are applied with polling in the opposite directions, and the front and rear sides are rocked like a seesaw as the center of the vibrator is the central axis of rotation.

Since the fixing part 5 is adhered and fixed to the vibrator 4 and the cantilever 6 is fixed to the cantilever fixing part 5, the cantilever fixing part 5 is also moved like a seesaw to forcedly vibrate the cantilever 6. The vibrator applied with uniform polling is used in the traditional cantilever holder. However, when the same alternating voltage is applied to vibrators with the same material in the same shape for comparison, one moved like a seesaw can be forcedly vibrated with a greater displacement.

FIGS. 3A and 3B are schematic diagrams illustrating the vibrating state of the cantilever. In FIG. 2 of the first embodiment, suppose the cantilever fixing part 5 is supported at two points of the front side 4a and the rear side 4b of the vibrator 4. The vibrator corresponding to the front side denotes 70, and the vibrator corresponding to the rear side denotes 71. Furthermore, it is considered that the cantilever fixing part 5 is combined with the cantilever 6 fixed to the cantilever fixing part in one piece, and they are schematically depicted by a lever 72. FIG. 3A is a traditional vibration mode. In this case, the vibrators 70 and 71 are displaced by y in the same direction, and the displacement of the top of the lever 72 (that is, the probe top of the cantilever) is also y. Therefore, the vibrators 70 and 71 give the displacement y to the cantilever to be forcedly vibrated.

On the other hand, FIG. 3B shows a vibration mode according to the invention. When the displacement y that is the same as the traditional mode is applied to the vibrators 70 and 71 so that the directions are reversed to each other, the lever 72 on the vibrator is moved in an arc at the angle θ. Here, suppose the length between the fulcrums of the front side 70 and the rear side 71 of the vibrator is 2L and the length from the fulcrum of the front side 70 to the top of the lever 72 is a. The displacement at the top of the lever 72 is y+a tan θ. Here, since tan θ=y/L, the displacement at the top of the lever 72 (that is, the displacement of the cantilever) is y+ay/L. The amplitude that is greater by ay/L than the traditional amplitude is given in displacement at one side to allow forced vibration.

Moreover, preferably, the cantilever is disposed so as to be a>L for extended displacement.

Again, FIG. 1 is used to describe the other configurations. The displacement of the amplitude or phase of the cantilever 6 is detected by the optical lever system 8 placed above the cantilever. In the optical lever system 8, laser beam from the semiconductor laser beam 13 is bent by a beam splitter 14, and irradiated onto the cantilever 6 from right above. The cantilever 6 is obliquely disposed, and the laser beam is reflected on the top surface of the cantilever on the side of a mirror 15. The laser beam reflected on the mirror 15 enters a four-split photodetector 16. The spot of the laser beam incident on the four-split photodetector 16 moves within the plane of the detector in response to the displacement of the amplitude or phase of the cantilever 6. The individual differentials on the four-split photodetector surface at that time are sensed to detect the displacement of the amplitude or phase of the cantilever 6.

On the other hand, a sample 17 is placed on under the probe 6a, and the sample 17 is placed on a triaxial fine adjustment mechanism 18. In the embodiment, a cylindrical piezoelectric device is used to control scanning within the sample surface (in the XY-direction) and the distance between the sample 17 and the probe 6a (in the Z-direction) by distortion deformation and stretch deformation of the cylindrical piezoelectric device.

The cantilever 6 is brought close to the sample 17 by a coarse adjustment mechanism (not shown) while the cantilever 6 is being vibrated in a constant amplitude at the frequency near the resonance frequency, and then the sample 17 is brought closer to the probe 6a by the fine adjustment mechanism. Thus, the amplitude or phase of the cantilever 6 are changed by force such as atomic force interacting between the sample 17 and the probe 6a, and by intermittent contact force when they are brought much closer to each other. Since a change in the amplitude or phase depends on the distance between the probe and the sample, a target value for the amplitude or phase is set beforehand for scanning in the XY-direction while feedback control is being done so that there is a constant distance between the sample and the probe. Thus, the image of irregularity on the sample surface can be measured.

Here, the amplitude or phase of the cantilever 6 are also changed by atmospheric viscous drag around the cantilever in addition to atomic force or intermittent contact force. This viscous drag is different from atomic force or intermittent contact force that are essentially desired for measurement, and becomes a factor that decreases measurement accuracy and response. According to the invention, the vibrator is driven like a seesaw to vibrate the cantilever 6, and thus the vibration amplitude is made greater than that of the related art. Therefore, the influence of air viscous drag can be reduced.

Furthermore, since the vibrator can be formed small as well, the stiffness of the instruments is improved to enhance response and resolution.

Figure 4:
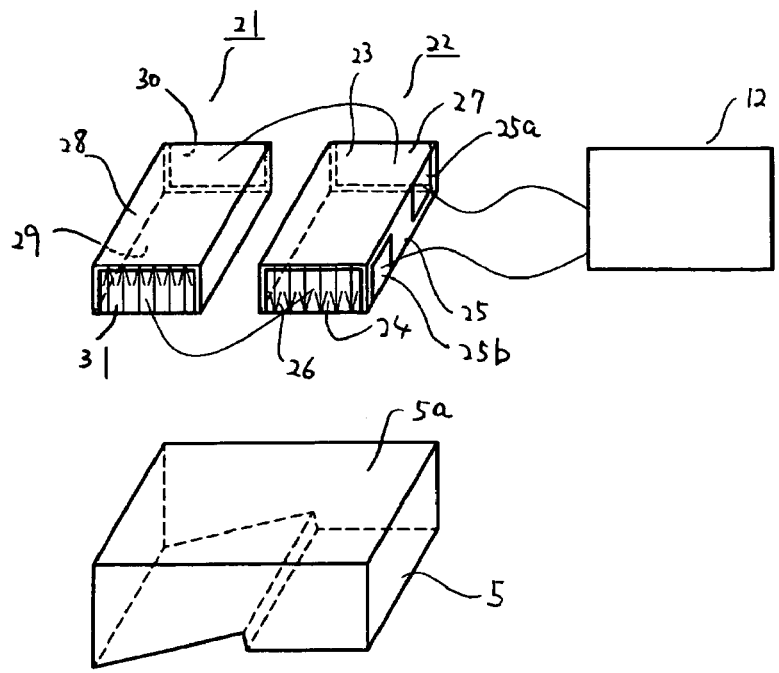
FIG. 4 is a detail drawing illustrating a vibrator of a scanning probe microscopy cantilever holder of a second embodiment according to the invention.

Next, a second embodiment according to the invention is shown in FIG. 4. In the embodiment, a vibrator is in a form different from the vibrator of the first embodiment, omitting the drawing and description other than the vibrator and a fixing part.

In the invention, vibrators 21 and 22 formed of two piezoelectric devices are disposed on the front and rear sides of a cantilever fixing part 5 to configure the vibrator. The vibrator 22 on the rear side is applied with polling in the thickness direction from the side of an insulating plate 3 to the cantilever fixing part 5 side. Furthermore, electrodes 23 and 24 are disposed on the upper and lower surfaces of the vibrator 22, respectively. The electrode 23 on the side of an insulating plate 3 is connected to a terminal electrode 25a on a rear side surface 25, and the electrode 24 on the fixing part side is connected to a terminal electrode 25b. The terminal electrode 25a is not connected to the terminal electrode 25b. Moreover, terminal electrodes 26 and 27 are disposed on the side surfaces orthogonal to the XY plane in the longitudinal direction of a cantilever. The terminal electrode 27 is connected to the upper side electrode 23, and the terminal electrode 26 is connected to the lower side electrode 24.

On the other hand, the vibrator 21 disposed on the front side is applied with polling in the opposite direction to the vibrator 22 disposed on the rear side. Electrodes 28 and 29 are disposed on the upper and lower surfaces of the vibrator 21, respectively. The electrode 28 on the insulating plate 3 side is connected to a terminal electrode 30 disposed on the side surface orthogonal to the XY plane in the longitudinal direction of the cantilever, and the electrode 29 on the fixing part side is connected to a terminal electrode 31 disposed on the side surface facing the terminal electrode 30. The terminal electrode 30 is not connected to the terminal electrode 31.

The terminal electrodes 25a and 25b on the rear side surface 25 of the rear side vibrator 22 are connected to an alternating current generator 12. In the vibrators 21 and 22 on the front and rear sides, the terminal electrodes 31 and 26 are connected to the terminal electrodes 30 and 23, and the upper electrodes are connected to the lower electrodes.

These two vibrators are adhered and fixed to the front and rear sides of a cantilever fixing part backside 5a.

When alternating voltage is applied to the vibrators 21 and 22, the polling directions are opposite in the front side vibrator 21 and the rear side vibrator 22, and thus they are displaced in the opposite directions in the thickness direction (the Z-direction). Therefore, the fixing part is rocked like a seesaw as the center is the central axis of rotation, and the vibration amplitude for the cantilever 7 can be increased as similarly to the first embodiment.

Figure 5:
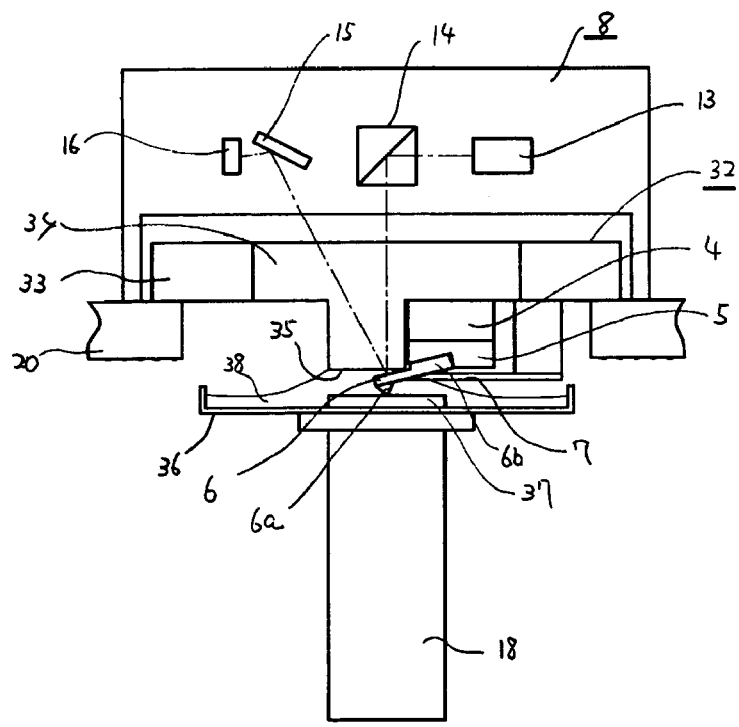
FIG. 5 is a profile illustrating a scanning probe microscope for use in liquid of a third embodiment according to the invention.

FIG. 5 depicts a third embodiment according to the invention. The embodiment is a scanning probe microscope operated in a solution. In addition, the components having the same configuration as those in FIG. 1 are designated the same numerals and signs, omitting the detailed description on the same components.

A base block 32 in the embodiment has the structure formed of a metal base block 33 and a glass base block 34. To the glass base block 34, a vibrator and a fixing part of the same configuration as those in FIG. 1 are adhered and fixed. Since the vibrator is used in the solution, the periphery is made watertight with a silicon sealing material to prevent an electrical short circuit.

On the glass base block 34, a projecting part 35 is disposed which has the projection top machined in a flat surface. On the other hand, a Petri dish 36 is placed on a triaxial fine adjustment mechanism 18 configured of a cylindrical piezoelectric device. A sample 37 is fixed in the Petri dish 36, including a bio-sample such as cells and organic thin films immersed in a culture solution.

When the sample 37 and the probe 6a are brought close to each other, a liquid layer 38 is produced between the flat surface part of the projecting part 35 and the liquid surface in the Petri dish by surface tension, and the cantilever 6 is immersed in the solution.

In an optical lever system 8, laser beam from a semiconductor laser 13 is bent by a beam splitter 14 in an air layer to pass through the glass part of the base block 34 of a cantilever holder, and travels to the liquid layer 38 for irradiation onto the backside of the cantilever 6. The laser beam reflected on the side of a mirror 15 on the backside of the cantilever 6 passes from the liquid layer 38 to the glass part of the base block 34, and then enters a four-split photodetector 16 through the mirror 15.

Here, since viscous drag is greater in a liquid than in the atmosphere, the amplitude of the cantilever becomes smaller than that in the atmosphere. However, a vibrator 4 according to the invention is rocked like a seesaw to increase the input amplitude of the cantilever 6, and the influence of viscous drag can be decreased.

With the configuration as described above, stable amplitude of the cantilever can be obtained even in the solution, and thus the image of topography of the sample can be measured highly accurately.

Figure 6:
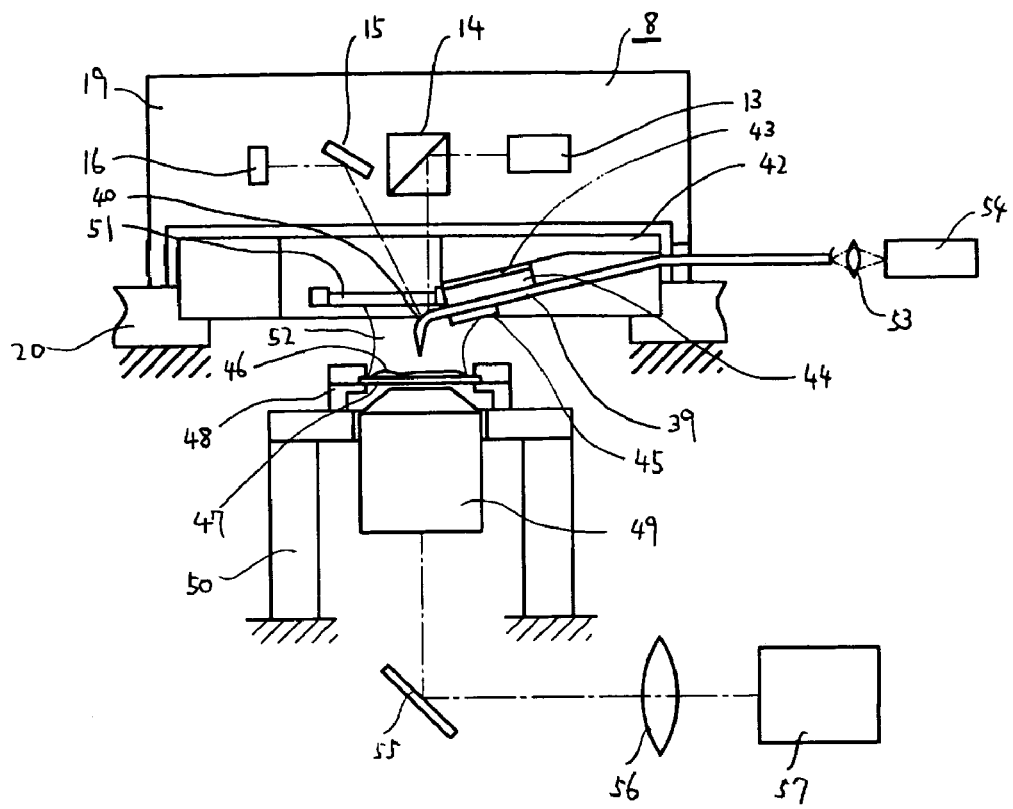
FIG. 6 is a profile illustrating a scanning near-field optical microscope for use in liquid of a fourth embodiment according to the invention.

FIG. 6 depicts a fourth embodiment according to the invention. In the invention, the embodiment is shown that a scanning near-field optical microscope, which is one type of scanning probe microscope, is operated in a solution.

In a probe 39 according to the invention, the tip end of an optical fiber is sharpened, the top of the probe part is curved against the optical axis of the fiber, an aperture of about 50 nm is disposed at the apex of the probe, a coating layer of chromium is applied for a primary coating, and a coating layer of gold for the surface other than the aperture is formed. Furthermore, on the backside of the probe 39, a mirror surface 40 is disposed for an optical lever system.

A cantilever holder in the embodiment has the configuration in which a vibrator 44 is fixed to a base block 42 through an insulating plate 43. The vibrator 44 has the same configuration as that shown in FIG. 2. In the embodiment, no cantilever fixing part is disposed. The vibrator 44 itself also served as a fixing part. Furthermore, the base part of the cantilever is not disposed on the probe 39 side. The probe itself also serves as a base part. Insulation is applied over the electrode part facing the probe 39 of the vibrator 44, and the probe 39 is directly closely contacted to the vibrator 44, and is pressed by a leaf spring 45. Moreover, the probe 39 is obliquely disposed in order to reflect the laser beam of an optical lever, and the top of the probe is curved at an angle orthogonal to a sample 46.

The sample 46 is prepared on a cover glass 47, and fixed to a sample holder 48. An object lens 49 is disposed on the side facing the probe 39 against the sample 46, and a triaxial fine adjustment mechanism 50 is disposed so as to surround the object lens 49. In the embodiment, a scanner is configured in which three cylindrical scanners that are the same one of FIG. 1 are arranged so as to surround the object lens.

On the other hand, on the side of a cantilever holder 41, a glass window 51 is disposed above the probe 39, and a liquid layer 52 is formed between the surface of the cover glass 47 and the surface of the window 51 by surface tension. Thus, the probe 39 and the sample 46 are immersed in the liquid layer 52, and measurement by scanning near-field optical microscopy can be conducted in the solution.

Furthermore, an optical lever system 8 that is the same one in the embodiment of FIG. 1 is assembled above the window 51 to measure the displacement of the probe.

When the vibrator 44 is driven like a seesaw as similarly to the first embodiment, the probe 39 is vibrated vertically. The variation in the amplitude or phase is made constant when the probe 39 and the sample 46 are brought close to each other, and thus the distance between the probe 39 and the sample 46 can be controlled.

The laser beam from a semiconductor laser 54 is coupled to the aperture of the probe 39 by a condenser lens 53, evanescent light is emitted from the aperture of the probe 39, and the evanescent light is illuminated onto the sample 46 while controlling the distance between the probe 39 and the sample 46 to be equal to or below 100 nm. The light emission such as scattered light and fluorescence from the sample 46 is collected by the object lens 49. The collected optical signal is bent by a mirror 55, and led to an optical detector 57 such as a photomultiplier with a imaging lens 56 for measuring light intensity.

Although the probe 39 is immersed in a solution and receives a great viscous drag, the vibrator 44 is rocked like a seesaw to be able to increase the input amplitude. Therefore, the influence of viscous drag can be decreased to allow stable measurement.

The scanning near-field optical microscope is configured in this manner, scanning is conducted in the XY-direction while the triaxial fine adjustment mechanism 50 is providing feedback so that the distance between the probe 39 and the sample 46 is constant in the Z-direction. Thus, the topography on the surface of the sample 46 and the optical measurement distribution can be measured in the solution highly accurately.

Figure 7:
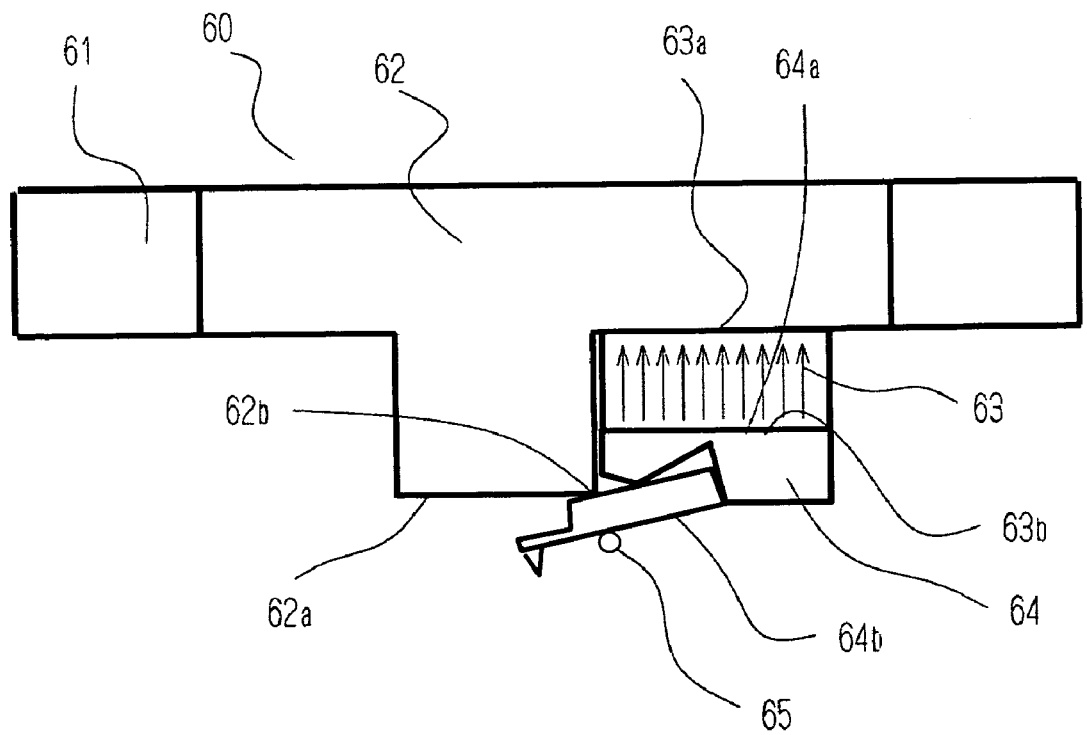
FIG. 7 is a profile illustrating a scanning probe microscopy cantilever holder of a fifth embodiment according to the invention.

FIG. 7 depicts a profile illustrating a scanning probe microscopy cantilever holder of a fifth embodiment according to the invention.

A base block 60 in the embodiment has the structure in which a glass base block 62 is fixed to a metal base block 61. To the glass base block 62, a vibrator 63 is adhered which is uniformly applied with polling in the thickness direction from a cantilever fixing part 64 to the base block 60, and the cantilever fixing part 64 is adhered and fixed to the vibrator 63.

Electrodes 63a and 63b are disposed on the upper and lower surfaces of the vibrator 63, respectively, and each of the electrodes is connected to an alternating current generator (not shown).

An angle projection 64a is disposed on the cantilever fixing part 64, and a cantilever base part 6b is supported by the projecting part 64a.

On the other hand, the glass base block 62 has a projection, and a projection top 62a thereof is machined in a flat surface. Here, a part of the cantilever base part 6b is arranged to contact with an edge part 62b at the projection top of the glass base block. More specifically, the edge part 62b of the glass base block is a supporting part, and the cantilever base part 6b is placed in nearly line contact at two places, the projection 64a of the cantilever fixing part and the edge part 62b of the glass base block.

Furthermore, the cantilever base part 6b is pressed in the direction of the supporting part 62b by a wire 65.

When alternating voltage is applied between the electrodes 63a and 63b of the vibrator by the cantilever holder in this configuration, the vibrator 63 is vibrated in the thickness direction to vibrate the base part of the cantilever 6b through the projection 64b of the cantilever fixing part. At this time, the cantilever 6 is rocked as the supporting part 62b is the central axis of rotation.

Figure 8:
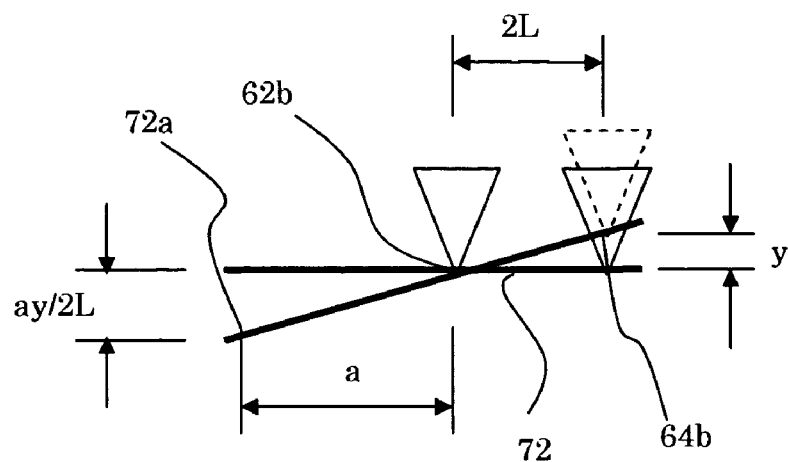
FIG. 8 is a schematic diagram illustrating the vibrating state of the cantilever holder shown in FIG. 7.
Figure 9:
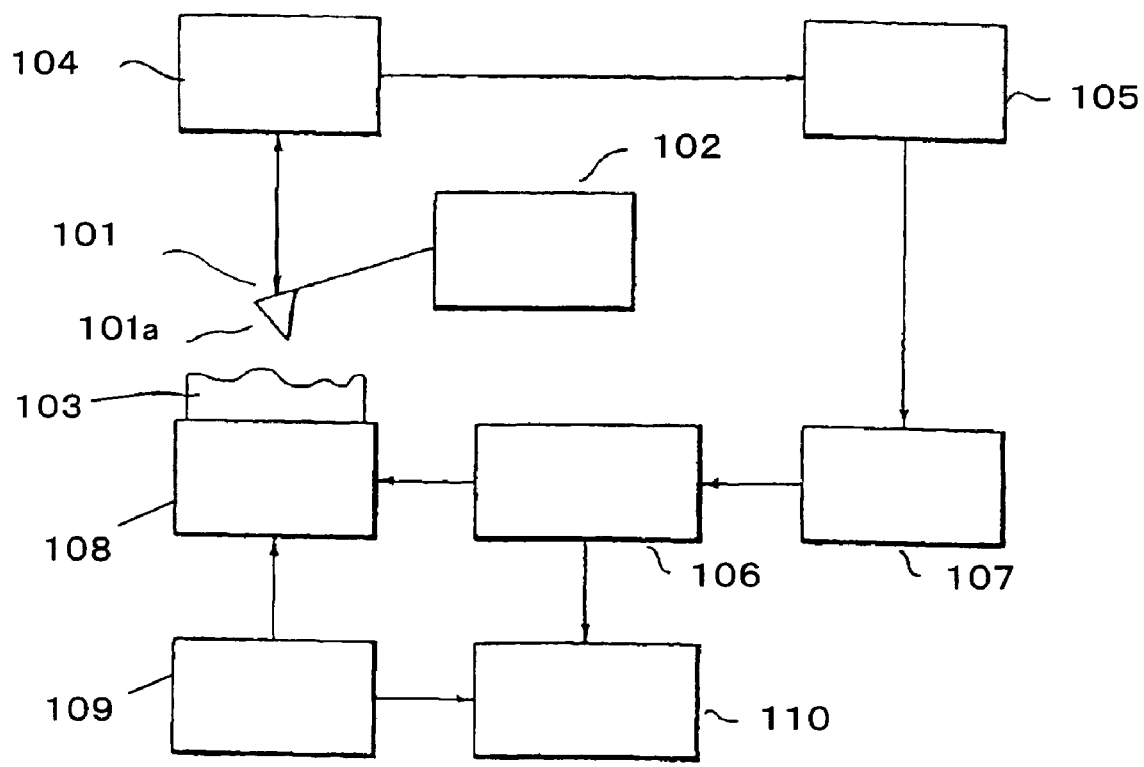
FIG. 9 is a configuration diagram illustrating a traditional scanning probe microscope.

FIG. 8 depicts a schematic diagram illustrating the vibrating state at this time. It is considered that the cantilever is combined with the cantilever base part in one piece, and they are depicted by a lever 72. Here, suppose the length between the projection 64a of the cantilever fixing part and the supporting part 62b is 2L, and the length from the edge 62b of the base block to a top of cantilever 72a is a. When the vibrator displaces the projection 64a of the fixing part by y, the displacement of the top of cantilever 72a is ay/(2L) At this time, the cantilever is placed so as to be a>2L. The top of cantilever can be operated with the displacement greater than that in translation movement, and the influence of viscous drag can be reduced to allow stable measurement.

In addition, in the embodiment, a part of the base block is used as the supporting part. However, the case where the supporting part is formed as a separate component from the base block and is the component placed on the base block is also included in the invention.

The invention is not limited to the embodiments described above. In the embodiments, the piezoelectric device is used for the vibrator, but any vibration modes can be utilized such as using electromagnetic force. Furthermore, in the invention, the measurement of the image of topography by the scanning probe microscope and the optical measurement by the near-field optical microscope are described. However, any kinds of scanning probe microscopes are included in the invention, which conduct measurements while the cantilever is being vibrated within the plane orthogonal to the sample surface, such as electrical measurement, frictional force measurement, and viscosity and elasticity measurement. Moreover, the types of cantilevers are not limited. Besides, the types of measurement environments and solutions are not limited as well, and measurements in gaseous atmospheres such as nitrogen and argon are also included in the invention.

What is claimed is:

1. A scanning probe microscopy cantilever holder comprising:
    a cantilever having a probe at a top of the cantilever thereof;
    a cantilever fixing part which fixes a base part of the cantilever;
    a vibrator which is fixed to the cantilever fixing part and vibrates the cantilever through the cantilever fixing part; and
    a base block which holds the cantilever fixing part and the vibrator,
    wherein the apex of the probe is disposed as facing a sample surface,
    a central axis of rotation is disposed which is nearly orthogonal to a major axis of the cantilever on the base part of the cantilever and is parallel in a direction of the sample surface, and
    the vibrator vibrates the base part of the cantilever to rock the base part of the cantilever as centering the central axis of rotation.

2. The scanning probe microscopy cantilever holder according to claim 1,
    wherein in the vibrator, when it is defined that a front side of the vibrator is a side close to the probe and a far side is a rear side along in a longitudinal direction of the cantilever, and the front side and the rear side of the vibrator are vibrated while they are being displaced to each other in opposite directions within a plane orthogonal to the sample surface.

3. The scanning probe microscopy cantilever holder according to claim 2, wherein the vibrator is configured of a piezoelectric device.

4. The scanning probe microscopy cantilever holder according to claim 2, wherein the vibrator is configured of separate piezoelectric devices on the front side and the rear side of the vibrator.

5. The scanning probe microscopy cantilever holder according to claim 2,
wherein the vibrator is configured of a piezoelectric device in one piece.

6. The scanning probe microscopy cantilever holder according to claim 1, wherein the vibrator is configured of a piezoelectric device.

7. The scanning probe microscopy cantilever holder according to claim 6, wherein the vibrator is configured of separate piezoelectric devices on the front side and the rear side of the vibrator.

8. The scanning probe microscopy cantilever holder according to claim 6,
wherein the vibrator is configured of a piezoelectric device in one piece.

9. The scanning probe microscopy cantilever holder according to claim 1, wherein the vibrator is configured of separate piezoelectric devices on the front side and the rear side of the vibrator.

10. The scanning probe microscopy cantilever holder according to claim 1,
wherein the vibrator is configured of a piezoelectric device in one piece, and
a polling directions are reversed on the front side and the rear side of the vibrator.

11. The scanning probe microscopy cantilever holder according to claim 1,
wherein the base block is disposed with a supporting part which supports the central axis of rotation,
the vibrator vibrates a part of the base part of the cantilever within a plane orthogonal to the sample surface, and
the base part of the cantilever is rocked as centering the supporting part.

12. The scanning probe microscopy cantilever holder according to claim 11, wherein the vibrator is configured of a piezoelectric device.

13. The scanning probe microscopy cantilever holder according to claim 1, wherein the cantilever is a scanning near-field microscopy probe in which an optical fiber is sharpened and a top of the probe is curved against a major axis of the optical fiber.

14. A scanning probe microscope comprising:
a sample holder which places a sample thereon;
a cantilever which is brought close to or contacted with the sample;
a cantilever holder which places the cantilever thereon; and
a triaxial fine adjustment mechanism which relatively moves the sample and the cantilever,
wherein the cantilever holder is the scanning probe microscopy cantilever holder according claim 1.

* * * * *